United States Patent [19]

Kawakatsu

[11] Patent Number: 5,000,528
[45] Date of Patent: Mar. 19, 1991

[54] SCRATCH RESISTANT OPTICAL INTERFERENCE FILM

[75] Inventor: Akira Kawakatsu, Kanagawa, Japan

[73] Assignee: Kabushiki Kaisha Toshiba, Kawasaki, Japan

[21] Appl. No.: 261,938

[22] Filed: Oct. 25, 1988

[30] Foreign Application Priority Data

Oct. 28, 1987 [JP] Japan ................. 62-270350

[51] Int. Cl.$^5$ ............ G02B 5/28; G02B 1/10
[52] U.S. Cl. ..................... 350/1.7; 350/164; 350/166
[58] Field of Search ........... 350/164, 166, 1.6, 1.7

[56] References Cited

U.S. PATENT DOCUMENTS

| 3,885,855 | 5/1975 | Gross | 350/166 |
| 3,895,155 | 7/1975 | Shukuri et al. | 350/166 |
| 4,609,267 | 9/1986 | Deguchi et al. | 350/166 |
| 4,649,088 | 3/1987 | Mitsui et al. | 350/164 |

FOREIGN PATENT DOCUMENTS 223136 5/1987 European Pat. Off. .
2385223 10/1978 France .

OTHER PUBLICATIONS

H. A. MacLeod: "Thin-Film Optical Filters", part 12, Applications of Filters and Coatings, 2nd Edition, 1986, pp. 499-501, Adam Hilger, Bristol, GB, pp. 499-501: Heat Reflecting Metal-Dielectric Coatings.

Primary Examiner—Bruce Y. Arnold
Assistant Examiner—David R. Parsons
Attorney, Agent, or Firm—Oblon, Spivak, McClelland, Maier & Neustadt

[57] ABSTRACT

A plurality of refractive layers of an optical interference film includes at least an inner metal layer having a prescribed refractive index and an outer-most layer of a metallic nitride compound having a refractive index higher than the inner metal layer for protecting the inner metal layer from oxidation, reduction, crystallization, etc.

14 Claims, 3 Drawing Sheets

SCRATCH RESISTANT OPTICAL INTERFERENCE FILM

BACKGROUND OF THE INVENTION

1. Field of the invention

The present invention relates to optical interference films. The optical interference film is generally used with a lamp to transmit light, the wave-length of which is within a specific range.

2. Description of the related art

Two different kinds of optical interference films are practically used. One of the two different kinds of optical interference films reflects infrared rays and transmits visible rays. The other optical interference film reflects visible rays and transmits infrared rays. A conventional optical interference film typically includes a dielectric layer and a metal layer each alternately accumulated one the other at a prescribed thickness. A thin layer of high refractive index substance, such as, e.g., titanium oxide ($TiO_2$), zinc sulfide (ZnS), etc., is used as a dielectric layer. Silver is used as a metal layer. The above-described conventional interference film is disclosed in Japan Laid-open patent application (KOKAI) No. 53-146482. In such an optical interference film, light in a prescribed wave-length range is reflected and light in the remaining wave-length range is transmitted by the light interference phenomenon when the thickness of each refractive index layer is controlled at a prescribed value. The above-described conventional optical interference film has less heat resistance and less resistance to humidity. For example, if the conventional optical interference film is used at a temperature more than 200° C. for an extended period, the optical characteristic thereof reduces. This is because silver in the metal layer is crystallized or oxidized by oxygen atoms of the dielectric layer. On the other hand, when zinc sulfide (ZnS) is used as the dielectric layer, the strength of the optical interference film is insufficient.

SUMMARY OF THE INVENTION

Accordingly, it is an object of the present invention to improve the mechanical characteristics of an optical interference film.

It is another object of the present invention to protect a metal layer included in an optical interference film from oxidation, reduction, crystallization, etc.

To accomplish the above-objects, an optical interference film includes a light permeable base, and at least two refractive layers of different refractive indices. The at least two refractive layers include an inner layer deposited on the base and an outer metallic nitride layer deposited on the inner layer. The outer metallic nitride layer has a refractive index higher than that of the inner layer. The outer metallic nitride may be selected from the group of aluminum nitride, silicon nitride and boron nitride. The inner layer may include a metal layer selected from the group of silver, gold and platinum.

BRIEF DESCRIPTION OF THE DRAWINGS

Other features and advantages of the present invention will be apparent from the following description taken in connection with the accompanying drawings wherein.

DETAILED DESCRIPTION OF THE PREFERRED EMBODIMENT

Figure 1:
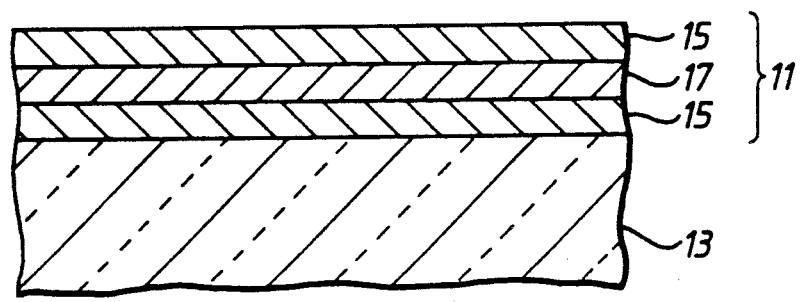
FIG. 1 is an enlarged sectional view illustrating an optical interference film of one embodiment of the present invention.

The preferred embodiment of the present invention will now be described in more detail with reference to the accompanying drawings. An optical interference film which reflects infrared rays and transmits visible rays is shown in FIG. 1. An optical interference film 11 is formed on the surface of a light permeable base plate 13 made of a quartz glass. Optical interference film 11 includes a metallic nitride compound layer 15, e.g., aluminum nitride (AlN), and a metal layer 17, e.g., silver (Ag). Metallic nitride compound layer 15 of aluminum nitride having a thickness of about 200 Å is formed on the surface of base plate 13 by a high frequency sputtering method. Metal layer 17 of silver having a thickness of about 200 Å is formed on metallic nitride compound layer 15 by the high frequency sputtering method. Furthermore, metallic nitride compound layer 15 of aluminum nitride having a thickness of about 200 Å also is formed on metal layer 17. Thus, the outer-most layer of optical interference film 11 is metallic nitride compound layer 15. The sublimation temperature of aluminum nitride in air is extremely high i.e., about 2300° C. No decomposition or degeneration of aluminum nitride occurs even at a high temperature. Aluminum nitride does not react on silver. The heat conductivity of aluminum nitride is relatively high, and the electric insulation ability thereof also is high. Furthermore, when aluminum nitride is formed in a thin-film shape, the thin-film aluminum nitride has a high density, and has a high mechanical strength. The thin-film aluminum nitride can prevent oxygen gas or hydrogen gas from being transmitted therethrough. The thin film is optically transparent, and the refractive index thereof is high, e.g., about 2.2.

As described above, metallic nitride compound layer 15 is optically transparent and has a high refractive index. Metal layer 17 also is optically transparent and has a low refractive index compared with metallic nitride compound layer 15. Therefore, the above-described optical interference film 11 including metallic nitride compound layer 15 and metal layer 17 transmits visible rays and reflects infrared rays by optical interference.

In the above-described embodiment, since metal layer 17 is sandwiched in between metallic nitride compound layers 15, no oxidation or crystallization of metal layer 15 occurs even if optical interference film 11 is heated at a high temperature for an extended period in air. Cracks or peelings of optical interference film 11 do not occur even when optical interference film 11 is heated repeatedly. Furthermore, since optical interference film 11 is hardly scratched, a desirable optical characteristic of optical interference film 11 is maintained for an extended period. When the above-described optical interference film was formed on the surface of a halogen lamp, cracks or peelings of optical interference film 11 were not observed during the operational life of the halogen lamp. Optical characteristic change of optical interference film 11 also was not observed.

It should be noted that if the thickness of optical interference film 11 is decreased below 200 Å, optical interference film 11 reflects visible rays and transmits infrared rays. This is because the reflection wave-length range of optical interference film 11 shifts toward a short wave-length side.

Figure 2:
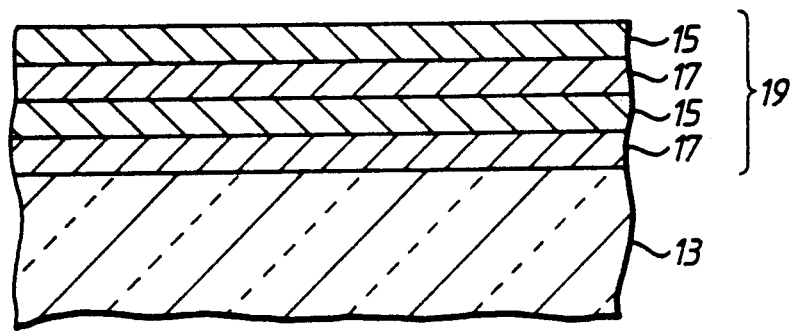
FIG. 2 is an enlarged sectional view illustrating an optical interference film of a second embodiment of the present invention.

As shown in FIG. 2, the optical interference film may include four layers. Metal layer 17 of silver is formed on the surface of a light permeable base plate 13. Metallic nitride compound layer 15 of aluminum nitride is formed on metal layer 17. Metal layer 17 of silver also is formed on metallic nitride compound layer 15. Furthermore, metallic nitride compound layer 15 of aluminum nitride is formed on metal layer 17. Thus, in this case also, the outer-most surface of optical interference film 19 is formed with metallic nitride compound layer 15. The above-described optical interference film 19 can reflect or transmit light in a specific wave-length range when each thickness of metal layer 17 and metallic nitride compound layer 15 is controlled at a prescribed range. In this case also, optical interference film 19 has advantages similar to those of optical interference film 11.

Figure 3:
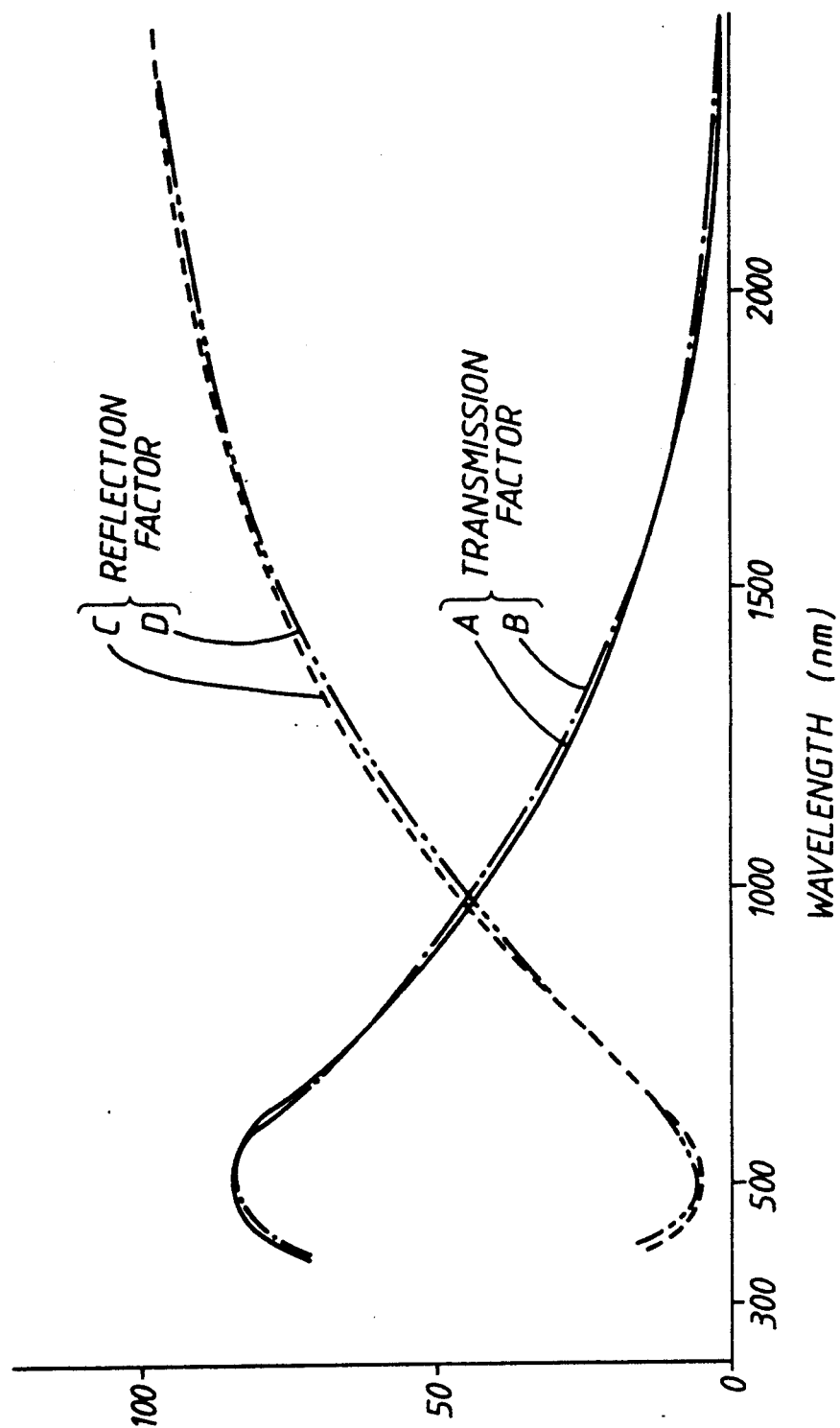
FIG. 3 is a graph illustrating changes in reflection factor and transmission factor of the optical interference film shown in FIG. 1 over a specific wavelength range before and after the optical interference film is heated for one hour.
Figure 4:
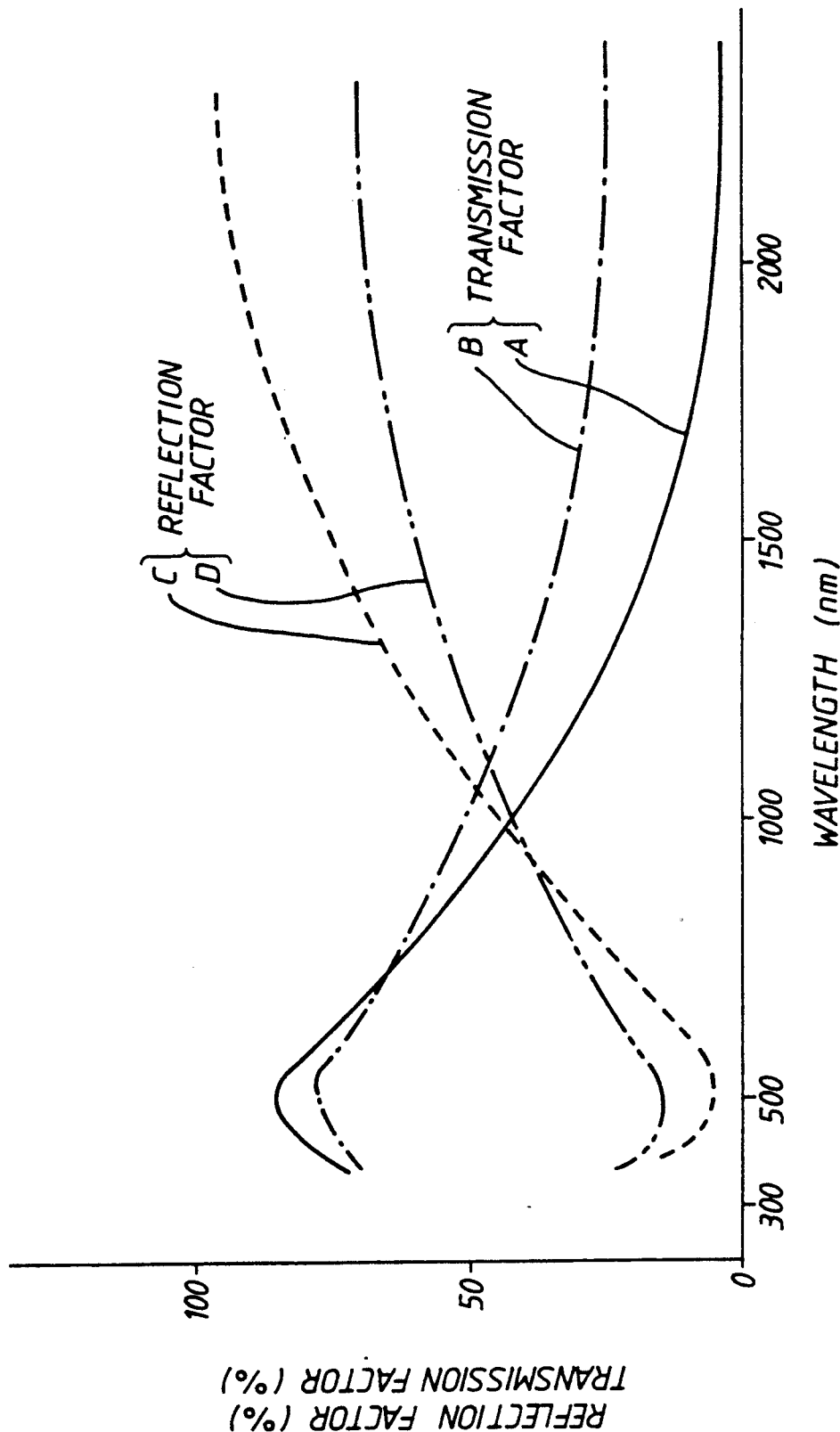
FIG. 4 is a graph illustrating changes in reflection factor and transmission factor of a conventional optical interference film over a specific wavelength range before and after the conventional optical interference film is heated for one hour.

FIG. 3 shows the result of an experiment wherein optical interference film 11 shown in FIG. 1 was heated at 300° C. for one hour in air, and changes in the optical characteristics thereof were observed before and after heating. For the purpose of comparison between optical interference film 11 of one embodiment and the conventional optical interference film, a similar experiment was carried out, and the result of the experiment is shown in FIG. 4. The conventional optical interference film included a three layer construction composed of titanium oxide layer, silver layer and titanium oxide layer formed on a base plate made of a quartz glass. Each layer had a thickness of 200 Å. In FIGS. 3 and 4, the abscissa expresses a wave-length (nm), and the ordinate expresses transmission factor (%) and reflection factor (%). Transition of transmission factor before heating is indicated by a solid line A, and transition of transmission factor after heating is indicated by a dot and dashed line B. Transition of reflection factor before heating the optical interference film is indicated by a dashed line C, and transition of reflection factor after heating the optical interference film is indicated by a chain double-dashed line D.

As can be understood from FIGS. 3 and 4, the optical characteristics, i.e., reflection factor and transmission factor, of optical interference film 11 of one embodiment seldom change before and after heating. On the contrary, the optical characteristics of the conventional optical interference film greatly change after heating, as shown in FIG. 4.

In the above-described embodiments, the metal layer tends to be heated by absorbing light. However, since both silver and aluminum nitride compound have a high heat discharging ability because of their high heat conductivity, the temperature of the optical interference film does not increase rapidly.

As shown in FIGS. 1 and 2, the optical interference film includes the metal layer of silver. However, the optical interference film may include metal layers of gold (Au) or platinum (Pt). Furthermore, the metallic nitride compound layer may be formed of silicon nitride ($SiN_4$) or boron nitride (BN). Certain kinds of metal are eroded by hydrogen gas or carbon monoxide gas. In this case, a nitride compound, e.g., aluminum nitride, which isolates such a metal from hydrogen gas or carbon monoxide gas may be used as the metallic nitride compound layer. The base plate may be made of a light permeable material, e.g., hard glass, soft glass or crystallized glass. Furthermore, effects in the present invention can also be achieved by an optical interference film which has two layers including a metal layer and a metallic nitride compound layer formed on the metal layer.

The present invention has been described with respect to a specific embodiment, however, other embodiments based on the principles of the present invention should be obvious to those of ordinary skill in the art. Such embodiments are intended to be covered by the claims.

What is claimed is:

1. An optical interference film which reflects light from the optical spectrum at a prescribed wavelength range, the optical interference film comprising:
    a light permeable base;
    a first refractive layer having first and second major surfaces substantially opposite to one another and made of a material having a prescribed refractive index, the first refractive layer being juxtaposed to the light permeable base; and
    a second refractive layer on both the first and second major surfaces of the first refractive layer and made of a metallic nitride compound material having a refractive index higher than the prescribed refractive index of the material of the first refractive layer.

2. A film according to claim 1, wherein the metallic nitride compound material of the second refractive layer includes aluminum nitride.

3. A film according to claim 1, wherein the material of the first refractive layer is a metal.

4. A film according to claim 3, wherein the metal of the material of the first refractive layer is selected from the group consisting of silver, gold and platinum.

5. A film according to claim 4, wherein the metallic nitride compound material of the second refractive layer includes aluminum nitride.

6. A film according to claim 4, wherein the metallic nitride compound material of the second refractive layer includes a substance selected from the group consisting of aluminum nitride, silicon nitride and boron nitride.

7. A film according to claim 1, wherein the metallic nitride compound material of the second refractive layer includes a substance selected from the group consisting of aluminum nitride, silicon nitride and boron nitride.

8. An optical interference film which reflects light from the optical spectrum at a prescribed wavelength range, the optical interference film comprising:
    a light permeable base;
    a first refractive layer having first and second major surfaces substantially opposite to one another and made of a material having a prescribed refractive index, the first refractive layer being juxtaposed to the light permeable base;
    a second refractive layer on both the first and second major surfaces of the first refractive layer and made of a metallic nitride compound material having a refractive index higher than the prescribed refractive index of the material of the first refractive layer; and and additional layer of the first refractive material interposed between the second refractive layer on one of the first and second major surfaces of the first refractive layer and the light permeable base.

9. A film according to claim 8, wherein the metallic nitride compound material of the second refractive layer includes aluminum nitride.

10. A film according to claim 8, wherein the material of the first refractive layer is a metal.

11. A film according to claim 10, wherein the metal of the material of the first refractive layer is selected from the group consisting of silver, gold and platinum.

12. A film according to claim 11, wherein the metallic nitride compound material of the second refractive layer includes aluminum nitride.

13. A film according to claim 11, wherein the metallic nitride compound material of the second refractive layer includes a substance selected from the group consisting of aluminum nitride, silicon nitride and boron nitride.

14. A film according to claim 8, wherein the metallic nitride compound material of the second refractive layer includes a substance selected from the group consisting of aluminum nitride, silicon nitride and boron nitride.

* * * * *